United States Patent [19]

Zelczer et al.

[11] Patent Number: 5,170,986

[45] Date of Patent: Dec. 15, 1992

[54] FLOW CONTROL BLADDERS FOR ZONE CONTROL APPARATUS

[76] Inventors: Alex Zelczer; Ruth Zelczer, both of 3840 Severn Rd., Cleveland Heights, Ohio 44118

[21] Appl. No.: 711,177

[22] Filed: Jun. 5, 1991

Related U.S. Application Data

[63] Continuation of Ser. No. 444,642, Dec. 1, 1989, abandoned.

[51] Int. Cl.$^5$ ............................................. F16K 31/145
[52] U.S. Cl. ........................................ 251/61.1; 138/93
[58] Field of Search .......................... 251/61.1; 138/93

[56] References Cited

U.S. PATENT DOCUMENTS

| | | | |
|---|---|---|---|
| 329,773 | 11/1885 | Perry | 138/93 |
| 587,102 | 7/1897 | Meany | 138/93 |
| 740,795 | 10/1903 | Behringer | 138/93 |
| 1,860,085 | 5/1932 | Gardner | 138/93 |
| 1,906,151 | 4/1933 | Goodman | 138/93 |
| 3,320,750 | 5/1967 | Haise et al. | 138/93 |
| 3,397,860 | 8/1968 | Bushmeyer | 251/61.1 |
| 3,840,177 | 10/1974 | Osheroff | 236/49 X |
| 3,890,994 | 6/1975 | Olsen | 251/61.1 |
| 3,990,464 | 11/1976 | Jenkins | 251/61.1 X |
| 4,029,128 | 6/1977 | Yamagishi | 138/93 X |
| 4,147,298 | 4/1979 | Leemhuis | 236/49 |
| 4,160,464 | 7/1979 | Ballinger | 138/93 |
| 4,356,963 | 11/1982 | Edwards et al. | 236/49 |
| 4,412,553 | 11/1983 | Kopp et al. | 251/61.1 X |
| 4,545,524 | 10/1985 | Zelczer | 236/49 X |

FOREIGN PATENT DOCUMENTS

681448  4/1951  United Kingdom .............. 251/61.1

*Primary Examiner*—William E. Wayner
*Attorney, Agent, or Firm*—Renner, Otto, Boisselle & Sklar

[57] ABSTRACT

A flow control bladder for controlling flow through a conduit such as an HVAC duct comprises a flexible walled body having a hollow interior and an inflation stem for passing an inflation fluid in and out of the hollow interior thereby transforming the body between an inflated condition for restricted flow through a conduit and a deflated condition for relatively unrestricted flow through a conduit. The body includes first and second panel walls, which normally are generally parallel when the body is in its deflated condition, and opposite side walls connected to the first and second panel walls at respective peripheral side folds. In addition, each side wall includes an inner fold which opens in a direction opposite the peripheral side folds when the body is in its deflated condition. The side walls are preferably folded between the panel walls although they may also be folded over one of the panel walls.

16 Claims, 6 Drawing Sheets

FLOW CONTROL BLADDERS FOR ZONE CONTROL APPARATUS

This is a continuation of copending application Ser. No. 07/444,642 filed on Dec. 1, 1989, now abandoned.

The invention herein described relates generally to flow control bladders and more particularly to bladders for use in zone control apparatus for controlling flow of a heating/cooling fluid through heating/cooling conduits such as HVAC ducts.

BACKGROUND OF THE INVENTION

Central heating and/or cooling systems typically employ a central fluid heating and/or cooling plant and respective conduits for directing the heated or cooled fluid to the rooms, offices, etc., in the house, unit or building being serviced by the system. A zone control apparatus for such systems may be employed to eliminate unnecessary heating/cooling of individual rooms or zones consisting of one or more rooms during cyclical periods of low or no use. Zone control apparatus are disclosed in U.S. Pat. No. 4,545,524 issued on Oct. 8, 1985 and entitled "Zone Control Apparatus for Central Heating and/or Cooling Systems"; U.S. Pat. No. 4,600,144 of the same title and issued on Jul. 15, 1986; and U.S. Pat. No. 4,702,412 of the same title and issued on Oct. 27, 1987.

The zone control apparatus disclosed in the above mentioned patents are characterized by one or more flow control devices which are installed in respective fluid conduits of the central heating and/or cooling system, and a cycle controller for cycling the flow control devices between high and low (or no) flow conditions. When in their low flow condition, the flow control devices restrict and preferably close off fluid flow through the associated conduits to minimize or eliminate direct heating or cooling of the associated rooms. The flow control devices are preferably located remote from the terminating ends of the fluid conduits to minimize heating or cooling losses associated with long conduits.

In certain systems, such as forced air systems, control of fluid (air) flow may be obtained by a bladder located interiorly of the fluid conduit. The bladder may have an air inlet fitting which may be used to anchor the bladder in place. The air inlet fitting may be coupled to an air supply line which may be selectively connected to a source of pressurized air, such as an air pump, and to the atmosphere respectively to inflate and deflate the bladder.

Desirably, the bladder when deflated should allow substantially unrestricted flow of the fluid through the conduit. On the other hand, the bladder when inflated should substantially if not totally restrict fluid flow through the conduit. Additionally, the bladder should be able to withstand and undergo an indefinite number of inflation cycles. This criteria should be met for conduits of varying sizes and shapes including HVAC ducts which typically are circular or rectangular.

SUMMARY OF THE INVENTION

The present invention provides flow control bladders for controlling fluid flow through a conduit. The bladders are able to withstand and undergo multiple inflation cycles while returning to substantially the same deflated condition. When in an inflated condition, the bladders allow substantially unrestricted flow of the fluid through the conduit. When in an inflated condition, the bladders substantially restrict fluid flow through the conduit.

According to one aspect of the invention, a flow control bladder for controlling flow through a conduit comprises a flexible walled body having a hollow interior and fluid passage means such as an inflation stem for passing an inflation fluid in and out of the hollow interior thereby transforming the body between an inflated condition for restricted flow through a conduit and a deflated condition for relatively unrestricted flow through a conduit. The body includes first and second panel walls, which normally are generally parallel when the body is in its deflated condition, and opposite side walls connected to the first and second panel walls at respective peripheral side folds. In addition, each side wall includes an inner fold which opens in a direction opposite the peripheral side folds when the body is in its deflated condition. The side walls are preferably folded between the panel walls although they may also be folded over one of the panel walls.

According to another aspect of the invention, a flow control bladder for controlling flow through a conduit comprises a flexible walled body having a hollow interior and fluid passage means for passing an inflation fluid in and out of said hollow interior thereby transforming said body between an inflated condition for restricting flow through such conduit and a deflated condition for relatively unrestrictive flow through such conduit. The body includes a panel wall and a bottom panel wall joined by a peripheral fold extending around the perimeter of the top and bottom panel walls, and the top and bottom panel walls are of like diamond shape having rounded corners.

According to still another aspect of the invention, a flow control bladder for controlling flow through a conduit comprises a flexible walled body having a hollow interior and fluid passage means for passing an inflation fluid in and out of said hollow interior thereby transforming said body between an inflated condition for restricting flow through such conduit and a deflated condition for relatively unrestricted flow through such conduit. The body includes a top panel wall and a bottom panel wall joined by a peripheral fold extending around the perimeter of the top and bottom panel walls, and the top and bottom panel walls are circular in shape apart from two diametrically opposite flattened side edges when the body is in its deflated condition.

The foregoing and other features of the invention are hereinafter fully described and particularly pointed out in the claims, the following description and the annexed drawings setting forth in detail certain illustrative embodiments of the invention, these being indicative, however, of but a few of the various ways in which the principles of the invention may be employed.

DETAILED DESCRIPTION

Referring now in detail to the drawings and initially to FIGS. 1-4, a flow control bladder according to the present invention is indicated generally at 30. The bladder 30 is intended for use in a rectangular section conduit and in FIGS. 1 and 2 the bladder is shown installed in a representative rectangular section air duct 32. The bladder is shown deflated in solid lines and inflated in phantom lines. When deflated the bladder lies or rests in a collapsed generally flat state on the bottom wall of the duct. On the other hand the bladder when inflated expands to close-off the duct. As will be further appreciated the bladder may conform to the shape of the duct to provide essentially complete shut-off of air flow through the duct.

Figures 1, 2, 4:
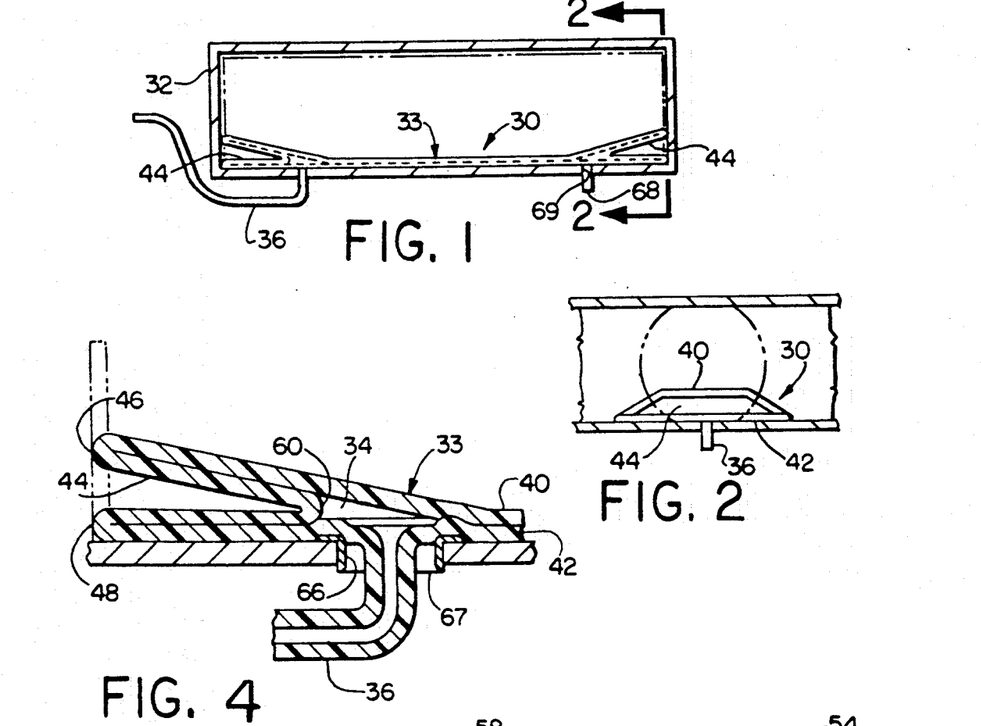
FIG. 1 is an elevational view a bladder according to the present invention shown installed in a rectangular section duct.
FIG. 2 is an elevational view taken from line 2—2 of FIG. 1.
FIG. 4 is an enlarged sectional view taken along line 4—4 of FIG. 3.

The bladder 30 includes a flexible walled body 33 having a hollow interior 34 and a tubular inflation stem 36 which communicates with the hollow interior 34. The inflation stem 36 provides a means for passing an inflation fluid, preferably air, in and out of the hollow interior 34 thereby transforming the body 33 between a deflated condition (solid lines) and an inflated condition (phantom lines).

The bladder 30 (as well as any of the other herein described bladders) may be made of any material suitable for an intended application. When the bladder is intended for use in heating and air conditioning ducts, preferred materials are those polymer materials listed by Underwriter's Laboratory for use in heating and air conditioning ducts. Specific materials for installation in heating and cooling ducts include Hytrel available from DuPont Company and Estane thermoplastic polyurethane available from B. F. Goodrich Company. Another UL listed material is polyvinylchloride (PVC) with aramid fiber netting material. If the latter PVC material is employed, the aramid fiber netting encloses the bladder body for fire rating purposes. The netting preferably is sized to accommodate the maximum inflated size of the bladder body and may function to prevent overexpansion of the bladder which may result from elastomeric stretch of the PVC material. Other material possibilities include, for hot air systems, a material having a glass fabric substrate and a heat resistant silicon resin coating. The bladder also may be made of other heat resistant plastics or rubberized canvas.

Preferably, the bladder 30 is blow molded although other molding, forming or fabricating techniques may be employed such as dip molding and heat sealing. Some of these techniques are discussed further below in connection with specific bladder embodiments according to the invention; however, it should be appreciated that other techniques may be applied. One preferred technique is using sheet panels which are heat sealed or welded together to form the bladder walls. Representative bladder wall thicknesses are 0.020 to 0.050 inch.

The bladder 30 also is formed with sufficient memory to restore it to an original predetermined generally flat configuration upon deflation. Consequently the bladder upon deflation will always return to its generally flat and unobstructing condition resting closely upon the bottom wall of the duct 32, thereby allowing fluid flow through the duct to be relatively unrestricted. Collapsing of the bladder to a compact state may be assisted by drawing a vacuum in the bladder.

The bladder body 33 includes a top panel wall 40, a bottom panel wall 42, and two opposite side walls 44. Each side wall 44 is connected or joined to the top and bottom panel walls at respective peripheral side folds 46 and 48. The top and bottom panel walls are also directly joined to one another at opposite peripheral edge folds 50.

The peripheral edge folds 50 preferably extend along straight fold lines which are parallel to one another and the long axis of the elongate bladder body. The peripheral side folds 46 and 48 at each end of the bladder body also extend along parallel fold lines; however, each of these folds is straight only at a central portion or segment 52 which is bordered by angled side segments or portions 54. Each angled side segment 54 extends from an inner somewhat rounded corner 56 at its union with the central segment 52 to an outer corner 58 at its union with the adjacent end of the corresponding peripheral edge fold 50. Consequently, the ends of the peripheral side folds not only merge with corresponding ends of the peripheral edge folds at the corners 58 but also with one another.

Figure 3:
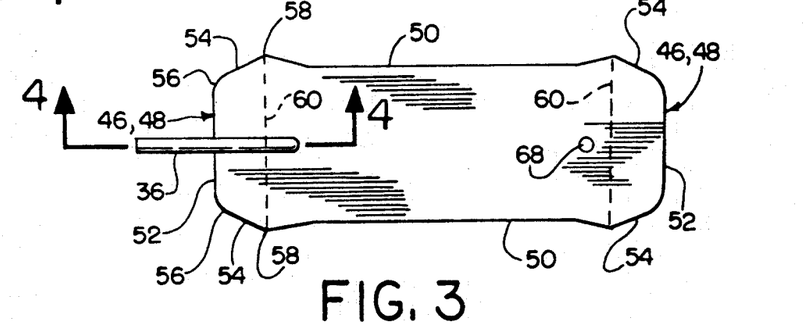
FIG. 3 is bottom view of the bladder of FIG. 1 separate from the duct.

The top panel wall 40 and bottom panel wall 42 of the bladder body 33 preferably are equal in size and roughly rectangular in shape as seen in plan view in FIG. 3. The peripheral side folds 46 and 48 are shorter than the peripheral edge folds 50 as will usually be preferable for rectangular duct 32 where its long dimension extends horizontally. In relation to the duct dimensions, the top and bottom panel walls preferably are of a length about equal the width (inside longer dimension) of the duct 32 as shown in FIG. 1. The width of the top and bottom panel walls is less critical. The width need only be sufficient to allow the top and bottom panel walls, when the bladder is inflated, to contact the top and bottom walls of the duct to seal against air (fluid) flow therebetween. In the illustrated embodiment the top and bottom panel walls upon inflation of the bladder assume a circular transverse section; accordingly, the width of the top and bottom panel walls at least should be equal to one-half the height of the duct times Pi and preferably greater to provide a flattened area of contact for sealing over a larger surface area.

The side wall 44 at each end of the bladder body 33 includes an inner fold 60 which opens in a direction opposite the peripheral side folds 46 and 48 when the body 33 is deflated. That is, the inner fold 60 opens outwardly whereas the peripheral side folds open inwardly. This inner fold preferably is located centrally between the peripheral side folds and the inner fold extends transversely between the corners 58 preferably along a straight fold line. The result is a side wall that is folded inwardly on itself to form what might be termed a hinged mouth side wall. The inner fold 60 is substantially parallel to the central straight segments 52 of the peripheral side folds and extends between corners 58.

In relation to the rectangular section duct 32, the side walls 44 each preferably have a length, measured between the peripheral side folds 46 and 48, equal to the height of the duct for contacting, when the bladder is inflated, the adjacent side wall of the rectangular section duct over its full height. The side wall may have a length greater than the height of the duct side wall (inside shorter dimension), but this may result in excess material which may prevent the side wall of the bladder body from being urged flat against the the side wall of the duct. The width of the side walls is less critical, such width being at least great enough to allow the side wall to unfold upon inflation of the bladder with a central region of the side wall assuming a generally flat or planar state for pressed contact against the side wall of the duct. The tapered side portions of the side walls defined between the angled side segments of the peripheral side folds serve to facilitate opening and closing of the side wall during inflation and deflation of the bladder and provide for a smoother transition between the side wall and the top and bottom panel walls when the bladder is inflated.

The flexible material of the bladder body 33 is permanently deformed at inner folds 60 and also at peripheral folds 46, 48 and 50. That is, the folds are "set" in shape so that upon deflation the resilient restoring force of the folds causes the bladder 30 to return to its original flattened configuration. The bladder 30 is preferably molded in this predetermined configuration or shape or after molding is heat set or the like to a predetermined configuration including the folds as aforedescribed. At least the folds have a set in them such that the resilience thereof will act to cause the bladder to return to its flattened condition. As best seen in FIG. 1 the top panel wall 40 for the most part lies flat atop the bottom panel wall 42 with the folded side walls 44 disposed or sandwiched between end portions of the top and bottom panel walls.

The bladder 30 is installed in the duct 32 with its long axis oriented perpendicular to the axis of the duct, i.e., perpendicular to the direction of air flow through the duct. If needed, a hole may be cut in the duct to permit insertion of the bladder into the duct. Once inserted and properly positioned as below described, the insertion hole may be closed by suitable means such as by a magnetic or other patch applied to the exterior of the duct, the patch having a dimension greater than that of the hole thereby to completely close the hole opening. In like manner the other herein described bladders may be inserted into a duct.

Preferably the inflation stem 36 is passed from inside the duct 32 to outside the duct through an opening in the bottom wall of the duct, such as a hole 66 drilled through the bottom duct wall. This permits convenient connection of the inflation stem to an air supply line exteriorly of the duct. Also, and importantly, the stem cooperates with the side walls of the opening to anchor the bladder in place. For this reason, the hole 66 in the bottom duct wall should be only slightly larger in diameter than the inflation stem. This also minimizes the possibility of leakage through the hole, although the hole will usually be closed off by the bladder overlying the same. As may be desired, a grommet 67 may be inserted into the hole as shown to prevent any sharp hole edges or burrs from damaging the inflation stem. The inflation stem preferably is formed from the same material as the bladder body and more preferably is integrally formed with the bladder body during blow molding of the bladder.

As seen in FIG. 3, the inflation stem 36 preferably joins the bladder body 33 at a point located along the longitudinal center line of the bladder inwardly of the relatively adjacent inner fold line 60. Accordingly the inflation stem joins the bladder body closer to one end than of the bladder than the other. Towards the other end of the bladder there is provided a locating/retaining protrusion in the form of a retaining tab 68 depending from the bottom panel wall 42 of the bladder body. The retaining tab preferably is located along the longitudinal center line of the bladder inwardly of the relatively adjacent inner fold 60. The retaining tab 68 is inserted through a second opening in the bottom wall of the duct 32, such as hole 69 drilled in the bottom wall. Together the inflation stem and the retaining tab cooperate to hold the bladder 30 in proper position within the duct 32. If desired, a nut, clip or other retaining device (not shown) may be secured to the end of the retaining tab protruding beneath the bottom duct wall to prevent the tab from lifting out of and hence disengaging the hole. Also, if desired, the inflation stem may be otherwise located and a second retaining tab located at the illustrated position of the inflation stem for two point anchoring of the bladder to prevent the bladder from turning within the duct as well as shifting along the length of the duct.

Once the bladder 30 is installed in the duct 32 as shown in FIGS. 1 and 2, an air supply line (not shown) may be connected to the end of the inflation stem 36. The air supply line may be used to supply to the bladder pressurized air from a source thereof such as an air pump and to vent pressurized air from the bladder, as in the manner described in any one of the above mentioned U.S. Pat. Nos. 4,545,524, 4,600,144 and 4,702,412, which are hereby incorporated herein by reference. Preferably this connection to a supply line is made above the plane of the bottom wall of the duct. To this end, the inflation stem is preformed to its shape illustrated in FIGS. 1 and 3. That is, the stem extends downwardly from the bottom panel wall of the bladder body substantially perpendicularly to the bottom wall and then outwardly parallel to the longitudinal axis of the bladder to a point located outwardly of the end of the bladder body. From this point the stem angles upwardly and outwardly to a point spaced above the plane of the bottom panel wall of the bladder body and from that point again outwardly parallel to the longitudinal axis of the bladder.

When deflated as seen in solid lines in FIGS. 1 and 2, the bladder 30 lays substantially flat on the bottom wall of the duct 32 to allow substantially unrestricted flow of hot or cold air through the duct. When inflated upon admission of pressurized air into the interior of the bladder, the bladder, as seen in phantom lines in FIGS. 1 and 2, balloons to conform to the interior shape of the duct thereby to shut off air flow through the duct. This conforming principally takes place along the vertical center plane of the bladder. Because of its flexibility and ability to conform to the shape of the duct, the bladder provides an effective means for completely sealing off air flow. When air flow through the duct is again desired, the pressurized air in the bladder is vented to atmosphere via the inflation stem whereupon the bladder will collapse to its deflated condition in a controlled manner in view of the memory provided in the molded bladder as above described.

Figure 5:
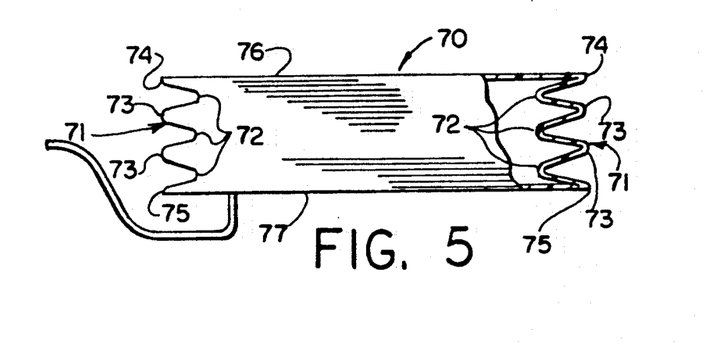
FIG. 5 is an elevational view, partly in section, of a bladder similar to that of FIG. 1 but having multiple side wall folds.

A modified form of the bladder 30 is shown partially inflated at 70 in FIG. 5. The bladder 70 is essentially the same as the bladder 30 except for its side walls 71. Instead of each side wall having only one inner fold as in the case of the bladder 30, the side walls 71 each include a plurality of folds including inner outwardly opening folds 72 which alternate with outer inwardly opening folds 73 as shown. The inner folds 72 are each positioned the same as the inner folds 60 of the bladder 30 and the outer folds 73 are similar to the peripheral side folds 74 and 75 where the side wall is joined to the top and bottom panel walls 76 and 77 of the bladder body 78. In relation to the bladder 30, the bladder 70 may be more suitable for use in rectangular ducts or other conduits having a higher height to width ratio as the side walls are longer in relation to the length dimension of the top and bottom panel walls of the bladder body.

Referring now to FIGS. 6-9, another flow control bladder according to the present invention is indicated generally at 80. The bladder 80 is particularly useful for use in circular and substantially circular section conduits and is shown installed in a circular duct 82 in FIGS. 6 and 7. The bladder 80 includes a flexible walled body 84 having a hollow interior 86 and an inflation stem 88 which communicates with the hollow interior.

The bladder 80 is shown as it may be made by dip molding from the above described PVC material. The bladder body includes a main part 89 which is dip molded and an elongate closure or patch 90 for the opening 91 in the dip molded main body part by which the main body part is removed from the dip mold. In the illustrated embodiment this opening 91 is provided in the portion of the main body part which forms the bottom panel wall of the bladder body and the opening extends along the longitudinal center axis of the bladder with the ends thereof terminating short of the ends of the bladder. The patch is an elongate relatively narrow flat strip of material formed by any suitable means. The patch spans the opening and is secured to the main body part by a suitable adhesive. Preferably, the inflation stem is formed integrally with the patch as shown. Also the bladder preferably is enclosed within aramid fiber netting (not shown) as above mentioned.

The body 84 includes a top panel wall 94, the aforesaid bottom panel wall 96 and two opposite side walls 100. The top panel wall 94 and the bottom panel wall 96 are substantially football profile shaped and are joined to the side walls 100 by peripheral side folds 101 and 102. The peripheral side folds 101 and 102 extend along parallel curved paths matching the football profile contour of the top and bottom panel walls and hence meet at opposite rounded corners or noses 104 and 105. Unlike a true football profile shaped object, the peripheral folds 101 and 102 include intermediate flat segments or portions 106.

Figure 7:
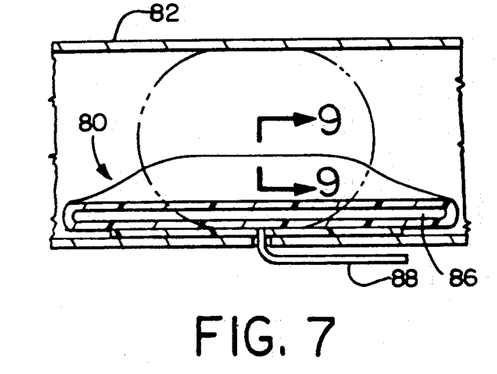
FIG. 7 is a sectional view taken along line 7—7 of FIG. 6.

The side walls 100 each include an inner fold 108 which opens in a direction opposite the peripheral folds 101 and 102 at the same side of the bladder. The inner folds 108 extend between the noses 104 and 105 along parallel straight fold lines symmetrically offset from the longitudinal center line of the bladder as shown. As in the bladder 30, the side walls are folded inwardly on themselves to form hinged mouth side walls. Upon inflation of the bladder the hinged mouth side walls open and together with the panel walls assume a circular shape in transverse cross-section; as the noses 104 and 105 move towards one another as seen in FIG. 7. In relation to the duct 82, the inflated circular shape preferably is about equal the diameter of the duct for which the bladder is intended to be used. In the case of the illustrated bladder 80 being made of a material which can stretch, the bladder may be successfully used with a range of duct diameters with stretching of the bladder walls permitting expansion of the bladder for full circumferential contact with the wall of the larger diameter ducts in the specified range.

Figures 8, 9, 10, 11, 12, 13, 15:
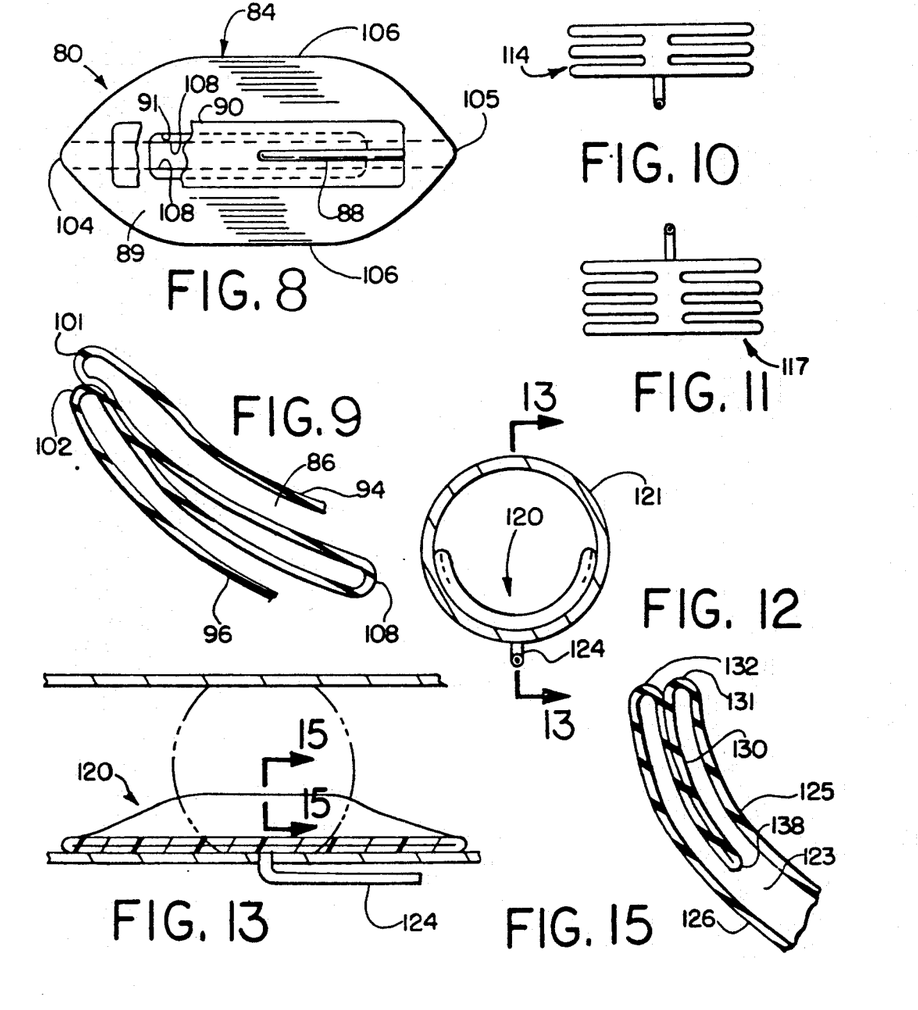
FIG. 8 is a bottom view of the bladder of FIG. 5 shown separate from the duct and in a planar condition.
FIG. 9 is an enlarged sectional view taken along line 9—9 of FIG. 7.
FIG. 10 is an end view of bladder similar to that of FIG. 6 but having a double inner folds in each side wall.
FIG. 11 is an end view of a bladder similar to that of FIG. 6 but having triple inner folds in each side wall.
FIG. 12 is an end view of another bladder according to the present invention installed in a circular section duct.
FIG. 13 is a sectional view taken along line 13—13 of FIG. 12.
FIG. 15 is an enlarged sectional view taken along line 15—15 of FIG. 13.

The bladder 80 is installed in the duct 82 with its long axis oriented parallel to the axis of the duct. Preferably the inflation stem 88 is passed from inside the duct to outside the duct through an opening such as a hole drilled in the bottom portion of the duct wall. As above discussed, the hole may be provided with a grommet to protect the inflation stem. The inflation stem 88 functions to anchor the bladder against movement along the axis of the duct while the curved bottom panel wall portion of the duct operates to prevent turning of the bladder. As seen in FIG. 8 the inflation stem preferably joins the bladder body at a point about midway between between the bladder ends or noses along the longitudinal center line of the bladder.

Figure 6:
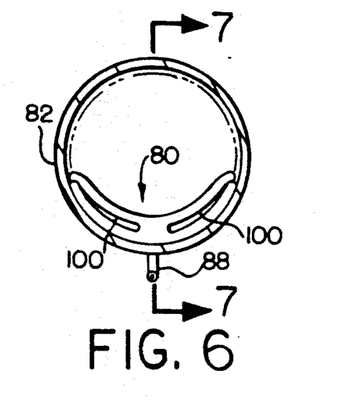
FIG. 6 is an end view of another bladder according to the present invention shown installed in a circular section duct.

Once the bladder 80 is installed in the duct 82 as shown in FIGS. 6 and 7, an air supply line (not shown) may may be connected to the end of the inflation stem for inflation and deflation of the bladder generally as above described in relation to the bladder 30. Preferably, the inflation stem is preformed to its shape illustrated in FIG. 7. That is, the stem extends downwardly from the bottom panel wall of the bladder body substantially perpendicularly to the bottom panel wall and then parallel to the longitudinal axis of the bladder.

When deflated as seen in solid lines in FIGS. 6 and 7, the bladder 30 lays substantially flat against the curved bottom wall portion of the duct 32 to allow substantially unrestricted flow of air through the duct. When inflated upon admission of pressurized air into the interior of the bladder, the bladder, as seen in phantom lines in FIGS. 6 and 7, balloons to conform to the interior shape of the conduit thereby to shut off air flow through the conduit. This conforming principally takes place along the vertical transverse center plane of the bladder. Because of its flexibility and hence ability to conform to the shape of the conduit, the bladder provides an effective means for completely sealing off air flow.

When air flow through the duct 82 is again desired, the pressurized air in the bladder 80 is vented to atmosphere via the inflation stem 88 whereupon the bladder will collapse to its deflated condition in a controlled manner in view of memory provided in the molded bladder. That is the bladder is formed with sufficient memory to restore it to an original predetermined generally flat configuration upon deflation. More particularly, the flexible material of the bladder body is permanently deformed at the folds, i.e., the folds are "set" in shape so that upon deflation the resilient restoring force of the folds causes the bladder 80 to return to its original flattened configuration. The top panel wall for the most part is supported atop the bottom panel wall with the folded side walls disposed or sandwiched between side portions of the top and bottom panel walls.

Like the bladder 30, the bladder 80 may be modified to include multiple folds in the side walls particularly for use with large diameter ducts. In FIG. 10, a modified bladder 114 is essentially the same as the bladder 80 except that the side walls include two inner folds and one outer fold. In FIG. 11, a modified bladder 117 can be seen to have side walls including two outer folds alternating with three inner folds. In both modified forms, the inner folds are similar to the inner fold in bladder 80 and the outer folds are similar to the peripheral side folds in bladder 80. However, the inner folds may be laterally staggered in relation to one another to lower the profile of the bladder when deflated, i.e., staggered so that adjacent folds do not stack one atop the other. Likewise, the outer fold or folds may be staggered in relation to each other and the peripheral edge folds.

Turning now to FIGS. 12-15, another flow control bladder according to the present invention is indicated generally at 120. The bladder 120 is intended for use in a circular or substantially circular section conduit and is shown installed in a circular section duct 121 in FIGS. 12 and 13. The bladder 120 includes a flexible walled body 122 having a hollow interior 123 and an inflation stem 124 which communicates with the hollow interior 123 for inflation and deflation of the bladder. The bladder may be made of flexible plastic or elastomeric material and may be molded or formed as by blow molding or dip molding as may be desired and applicable to the material of the bladder. If dip molded, the bladder may be fabricated in a manner similar to that described above in connection with the bladder 80.

The bladder body 122 has a top panel wall 125, a bottom panel wall 126, and two opposite side walls 130. Each side wall 130 is joined to the top and bottom panel walls 125 and 126 at respective peripheral side folds 131 and 132 which are straight and parallel to the longitudinal axis of the bladder. The top and bottom panel walls 125 and 126 also are directly joined to one another at opposite peripheral edge folds 133 extending between the ends of the peripheral side folds and consequently between the side walls 130. The peripheral edge folds 133 are roughly V-shape with the V pointing outwardly and with a rounded corner at the vertex of the V. The peripheral folds 133 join with peripheral side folds 131 and 132 at rounded inner corners 135. The arrangement of the peripheral folds gives the top and bottom panel walls the shape of a square or diamond which has two diagonally opposed truncated corner corresponding to the peripheral side folds.

The side walls 130 each include an inner fold 138 which opens in a direction opposite the peripheral side folds 131 and 132. Each inner fold 138 extends along an arcuate fold line between the ends of the corresponding peripheral side folds, joining with the side folds at rounded corners 135. All portions of the inner folds 138 preferably are spaced laterally outwardly from the longitudinal axis of the bladder.

Figures 14, 16, 17, 18, 19, 20, 21, 22, 23:
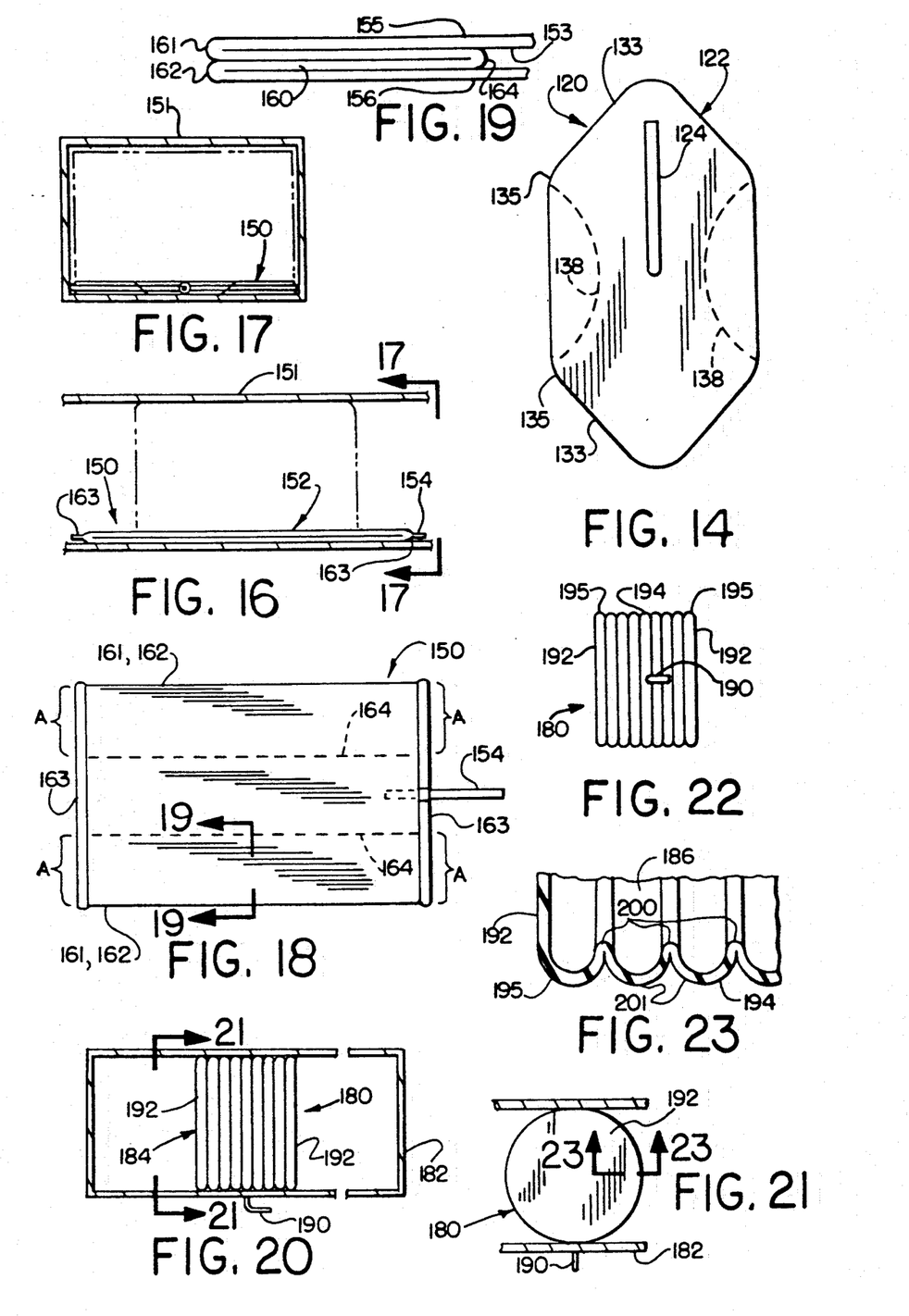
FIG. 14 is bottom view of the bladder of FIG. 12 separate from the duct and in a planar or flat condition.
FIG. 16 is an elevational view of another bladder according to the present invention shown installed in a rectangular section duct.
FIG. 17 is a view taken from line 17—17 of FIG. 16.
FIG. 18 is a plan view of the bladder of FIG. 16 separate from the conduit.
FIG. 19 is an enlarged sectional view taken along the line 19—19 of FIG. 18.
FIG. 20 is an elevational view of another bladder according to the present invention shown installed in a rectangular section duct.
FIG. 21 is a view taken from line 21—21 of FIG. 20.
FIG. 22 is a bottom view of the bladder of FIG. 20 separate from the duct.
FIG. 23 is an enlarged sectional view taken along line 23—23 of FIG. 21.

The inflation stem 124 is similar to the inflation stem of the bladder 80. Likewise, the dimensional relationship of the bladder to the duct size or sizes for which it is designed is similar to the bladder 80. Preferably the inflation stem is located centrally along the longitudinal axis of the bladder as shown in FIG. 14. The bladder 120 may be installed in the duct in the same manner as the bladder 80 with its longitudinal axis parallel to the axis of the duct. The bladder may be inflated and deflated as described in connection with the bladder 80.

Referring now to FIGS. 16-19, another flow control bladder according to the present invention is indicated generally at 150. The bladder 150 is intended for use in a rectangular section conduit and is shown installed in a rectangular duct 151 in FIGS. 16 and 17. The bladder 150 includes a flexible walled body 152 having a hollow interior 153 and an inflation stem 154 communicating with the interior for inflation and deflation of the bladder. In this particular embodiment a heat sealable or weldable material is used for fabricating the bladder body from sheet stock.

The bladder body 150 includes a rectangular top panel wall 155, a rectangular bottom panel wall 156 and side walls 160. Each side wall 160 is joined to the top and bottom panel walls at respective peripheral side folds 161 and 162. The top and bottom panel walls also are directly joined to one another at opposite peripheral edge folds 163. Unlike the folds formed in the above described bladders which are continuously rounded folds or creases in the bladder wall material, the peripheral edge folds 163 are formed by heat sealing or adhesively bonding juxtaposed edge flange portions of the walls together.

The peripheral side folds 161 and 162 are generally U-shape with the legs of the U extending coextensively with and being heat sealed or otherwise bonded to coextensive portions of the peripheral edge folds (over bracketed regions A). The side walls 162 each include an inner fold 164 which opens in a direction opposite the peripheral side folds 161 and 162 when the body 150 is in a deflated condition. The inner folds 164 each are positioned substantially parallel to the base or central portion or segment of the peripheral side folds 161 and 162 and extend substantially the length of the bladder. As seen in FIG. 18 the inner folds of the side walls are spaced outwardly of the longitudinal center line of the bladder, as preferred.

As will be appreciated the bladder body 152 may be fabricated from a sheet of plastic material by joining longitudinal edges of the sheet to form a tubular structure. Side portions of the tubular structure may then be folded inwardly on themselves and the folded structure flattened for heat sealing along the open ends of the folded and flattened tubular structure. When formed in this manner the peripheral side folds and the inner folds are creased as by heat setting to provide memory therein. Prior to heat sealing at the peripheral edge folds the inflation stem in the form of a tube has one end thereof inserted into the tubular structure and the peripheral edge flanges are heat sealed around a coextensive middle portion of the inflation stem to secure the inflation stem in place and seal against leakage around the stem.

The bladder 150 is installed in the duct with its long axis located parallel to the axis of the duct and with the inflation stem extending in the duct parallel to the duct's axis. The stem may be connected to a supply line fed along the length of the duct or the stem may be of sufficient length for passage out through a hole in one of the duct walls.

Another flow control bladder according to the invention is indicated at 180 in FIGS. 20-23. The bladder 180 is intended for use in a rectangular section conduit and is shown installed in a rectangular section duct 182 in FIGS. 20 and 21. The bladder 180, also aptly referred to as a bellows, includes a flexible wall body 184 having a hollow interior 186 and an inflation stem 190 communicating with the hollow interior 186. The body 184 includes two circular end panel walls 192 and a circumferentially continuous side wall 194. The side wall is connected to the end panel walls at respective peripheral side folds 195 which circumscribe the end panel walls. In relation to the above described embodiments of the invention, diametrical halves of the bladder side wall may be viewed as opposite side walls having respective peripheral side folds which in this instance are semicircular.

The side wall 194 includes a plurality of inner folds 200 which alternate with a plurality of outer folds 201. The inner folds open in a direction opposite the peripheral folds 195 whereas the outer folds open in the same direction as the peripheral folds. The inner folds extend circumferentially around the body, but semicircular portions of the folds can be viewed as residing in respective semicircular side walls of the bladder body.

As is best seen in FIGS. 20 and 22, the inflation stem 190 extends radially from the side wall 194 and more particularly from one of and preferably the central-most outer fold 201. With the inflation stem centrally located along the axis of the bladder, the bladder may be installed centrally in the duct 182 as shown with its axis extending perpendicular to the direction of flow through the duct. Then, upon inflation, the bladder expands axially at both ends to close off the duct. The stem 190 may exit the duct through an opening in the bottom wall of the duct 182. The bladder 180 is positioned in a central portion of the conduit 182 so that during inflation both ends of the body 184 will move outwardly to contact the side walls of the duct. Also during inflation upper and lower portions of the side wall will be forced against the top and bottom walls of the duct and the folds in the side walls will tend to flatten out upon sufficient application of pressure within the bladder. Such flattening will occur in particular at the portions of the side wall being urged against the duct walls.

Figure 24:
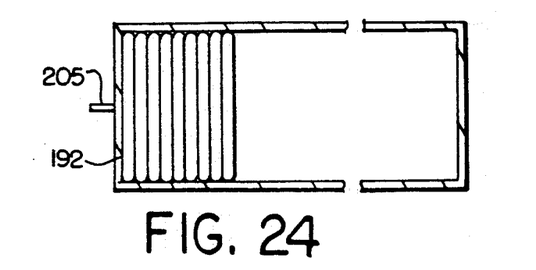
FIG. 24 is an elevational view of a bladder similar to that of FIG. 20, but having an inflation stem extending from an end panel wall.
Figure 25:
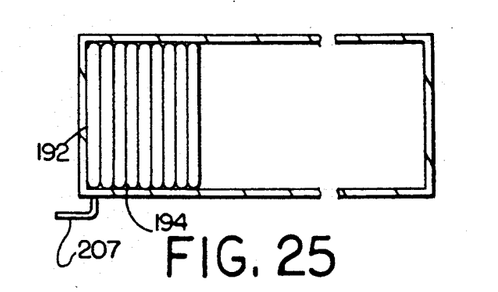
FIG. 25 is an elevational view of a bladder similar to that of FIG. 20, but having an inflation stem extending from a different location on the side wall.

Variations in the placement of the inflation stem 190 on the bladder body are shown in FIGS. 24 and 25. In FIG. 24, an inflation stem 205 extends outwardly from one of the end panel walls 192 of the illustrated modified bladder which otherwise is identical to the bladder 180. This permits mounting of the bladder at one side of the duct with the inflation stem exiting the duct through an opening in the adjacent side wall of the duct. In FIG. 25, an inflation stem 207 extends radially outwardly from the side wall 194 adjacent one of the end panel walls 192 of a modified bladder which otherwise is identical to the bladder 180. Again the bladder may be mounted adjacent a side wall of the duct, but with the inflation stem exiting the duct through a hole in the top duct wall or in the bottom duct wall as shown. If desired the bladder may be rotated 90 degrees about its axis to provide for connection of the inflation stem to a supply line interiorly of the duct. In both variations one end of the bladder remains stationary during inflation of the bladder while the other moves to engage and seal against the opposite side wall of the duct.

Figure 26:
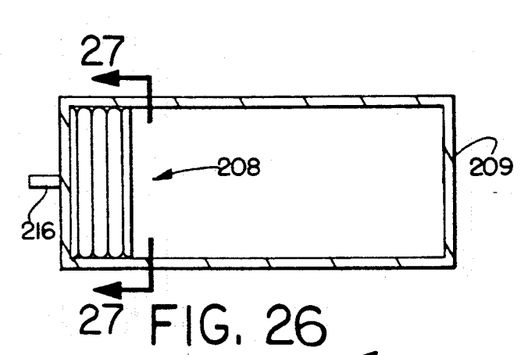
FIG. 26 is an elevational view of another bladder according to the present invention shown installed in a rectangular section duct.
Figure 27:
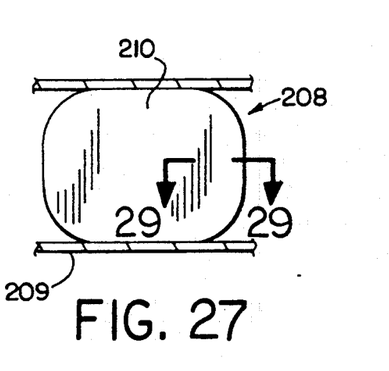
FIG. 27 is view taken from line 27—27 of FIG. 26.
Figure 28:
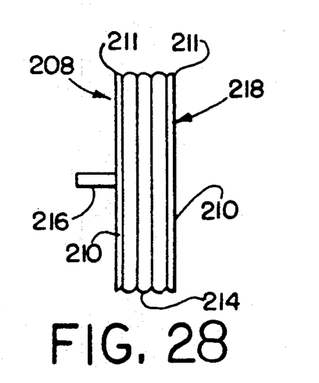
FIG. 28 is plan view of the bladder of FIG. 26 separate from the duct.
Figure 29:
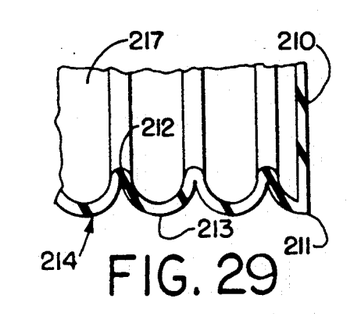
FIG. 29 is an enlarged sectional view taken along line 29—29 of FIG. 27.
Figure 30:
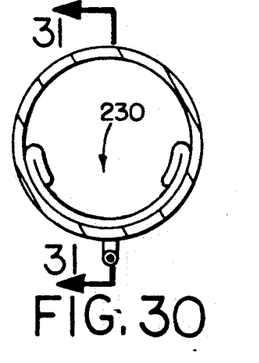
FIG. 30 is an end view of another bladder according to the present invention shown installed in a circular duct.
Figure 31:
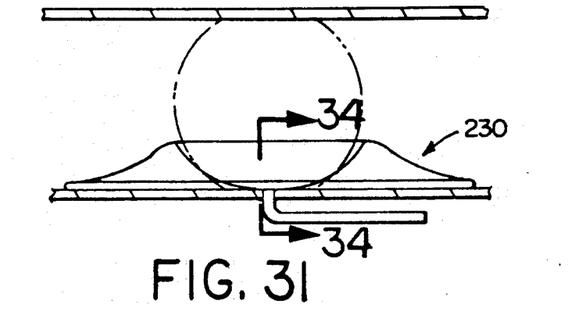
FIG. 31 is a view taken from line 31—31 in FIG. 30.
Figure 32:
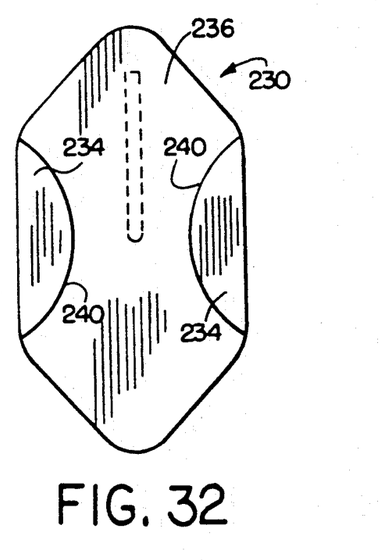
FIG. 32 is a plan view of the bladder of FIG. 30 separate from the conduit and shown in planar condition.
Figures 33, 34:
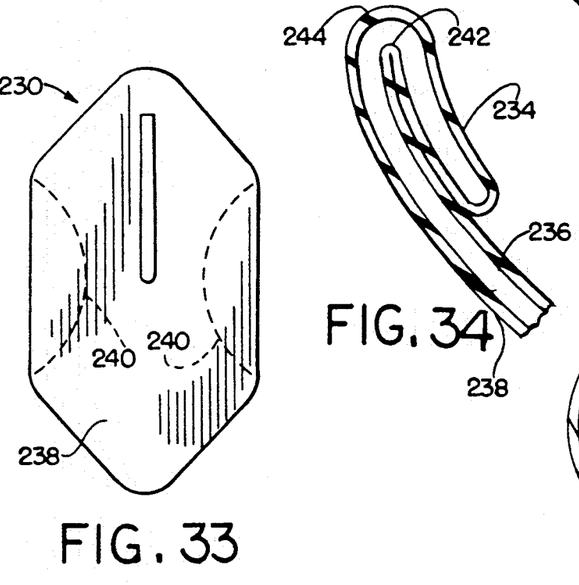
FIG. 33 is a bottom view of the bladder of FIG. 30.
FIG. 34 is an enlarged sectional view taken along line 34—34 of FIG. 31.
Figure 35:
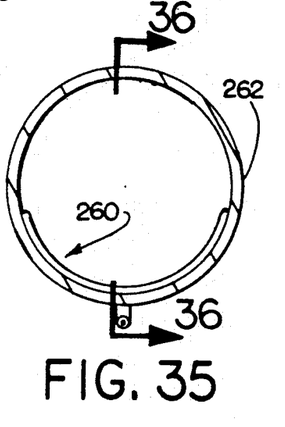
FIG. 35 is an end view of another bladder according to the present invention shown installed in a circular section duct.
Figure 36:
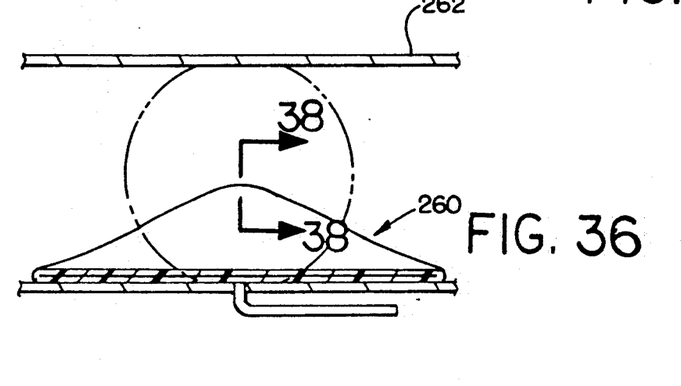
FIG. 36 is sectional view taken along line 36—36 of FIG. 35.

Referring now to FIGS. 26-29, another bladder according to the present invention is indicated generally at 208. In FIGS. 26 and 27, the bladder 208 is shown installed in a rectangular section duct 209. The bladder 208 is similar to bladder 180 with the primary difference being a different cross-sectional shape. Instead of circular, the end panel walls 210 are of rectangular shape with rounded corners. The peripheral side folds 211 are of similar shape as are the inner folds 212 and outer folds 213 in the side walls 214 of the bladder body. Like in the other bladders, an inflation stem 216 communicates with the hollow interior 217 of the bladder body 218. The inflation stem 216 is shown extending outwardly from one of the end panel walls 210 through an opening in a side wall of the duct 209, however the stem 212 may be otherwise positioned as discussed above regarding the bladder 180.

In FIGS. 30-34 another flow control bladder according to the invention is indicated generally at 230. The bladder 230 is essentially identical to the bladder 120 shown in FIGS. 12-14, except for how the side walls are folded. In the bladder 230 the side walls 234 are folded not between the top and bottom panel walls 236 and 238 of the bladder body, but instead over the top panel wall. Each side wall still has an inner arcuate fold 240 and this fold is located inwardly of the peripheral side folds 242 and 244 where the side wall joins the top and bottom panel walls.

Figures 37, 38, 39, 40, 41, 42:
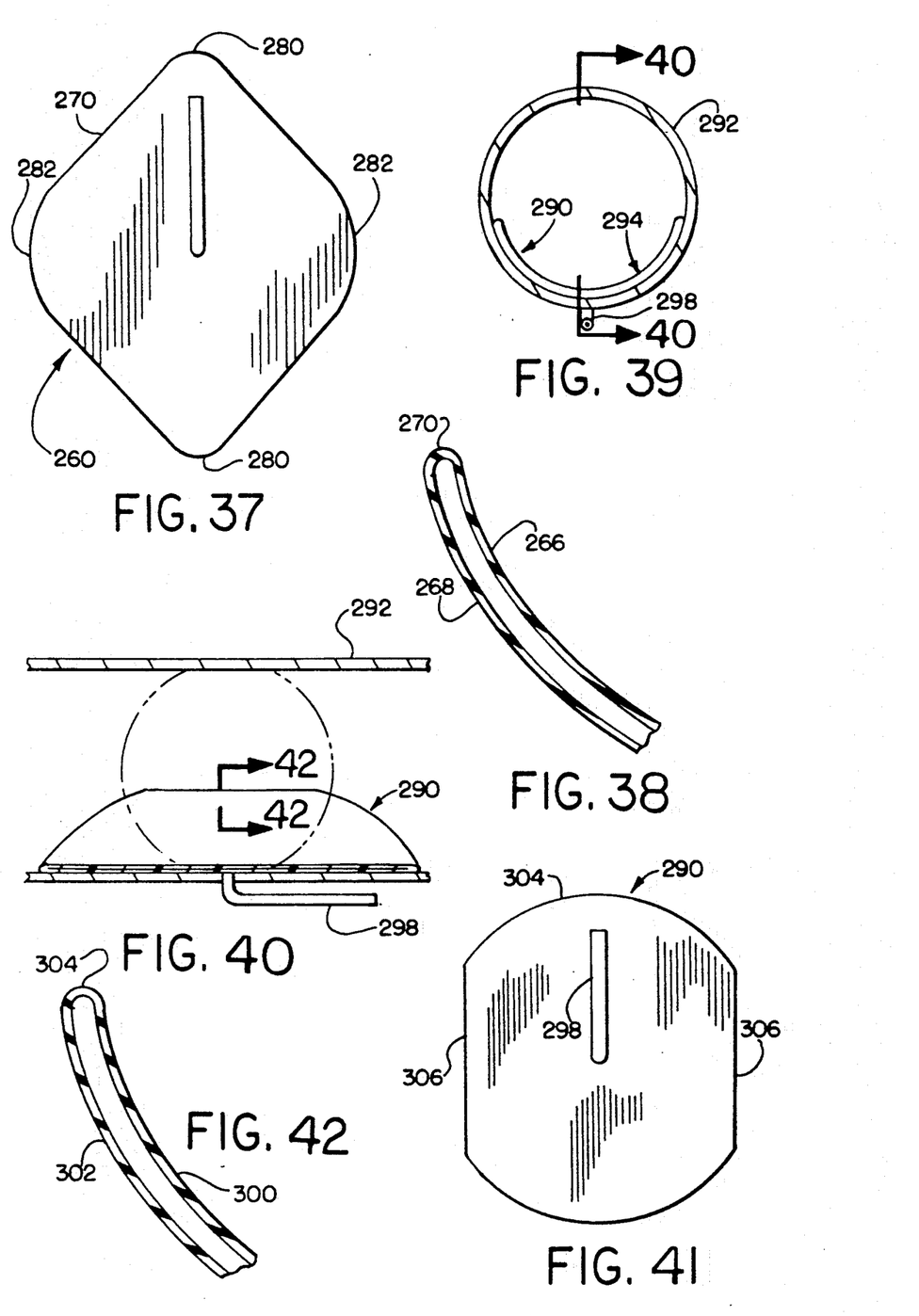
FIG. 37 is a bottom view of the bladder of FIG. 35 separate from the duct.
FIG. 38 is an enlarged sectional view taken along line 38—38 of FIG. 35.
FIG. 39 is an end view of another bladder according to the invention shown installed in a circular section duct.
FIG. 40 is a sectional view taken along the line 40—40 of FIG. 39.
FIG. 41 is a bottom view of the bladder of FIG. 39 shown in a flattened condition.
FIG. 42 is an enlarged sectional view taken along line 42—42 of FIG. 40.

In FIGS. 35-38 still another flow control bladder according to the present invention is indicated at 260. The bladder 260 is primarily intended for circular section conduits and is shown installed in a circular section duct 262 in FIGS. 35 and 36. The bladder is essentially the same as the bladder 230 except for the absence of any peripheral side folds. In the bladder 260 the top and bottom panel walls 266 and 268 are joined to one another by a perimeter edge fold 270. As seen in FIG. 37, the top and bottom panel walls have a diamond shape with rounded corners. The corners 280 located on the longitudinal axis of the bladder preferably have a radius of curvature less than the radius of curvature of the other corners 282 located on the transverse axis of the bladder.

Referring now to FIGS. 39-42, another flow control bladder according to the invention is indicated at 290. The bladder 290 includes a flexible walled body 294 having a hollow interior 296 and an inflation stem 298, like in the other bladders herein described. The body 294 includes a top panel wall 300 and a bottom panel wall 302 which are joined by a perimeter fold 304. The top and bottom panel walls 300 and 302 are circular in shape except for two opposite flattened sides 306. When installed in a circular duct 292, the bladder 290 is positioned so that the flattened sides 306 are parallel to the intended direction of flow of air through the duct. The flattened sides upon inflation of the bladder provide for contact with the duct over a relatively wide annular area.

As can now be fully appreciated, the present invention provides control flow bladders which will allow substantially unrestricted flow of a fluid through a conduit when in a deflated condition and will substantially or completely block fluid flow through the conduit when in an inflated condition. Additionally, the bladder is able to withstand and undergo an indefinite number of inflation cycles.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only by the scope of the following claims.

What is claimed is:

1. A flow control bladder for controlling flow through a conduit, comprising:
   a flexible walled body having a hollow interior; and
   fluid passage means for passing an inflation fluid in and out of said hollow interior thereby transforming said body between an inflated condition for restricted flow through a conduit and a deflated condition for relatively unrestricted flow through a conduit; and
   wherein said body includes first and second panel walls, which normally are generally parallel when said body is in said deflated condition, and opposite side walls connected to the first and second panel walls at respective peripheral side folds, each side wall includes an inner fold which opens in a direction opposite the peripheral side folds when said body is in said deflated condition, said peripheral side folds extend between and converge towards one another at opposite ends of said body, said opposite ends of said body are movable towards one another upon inflation of said body, and said body is formed, at least in the regions thereof containing said side and inner folds, of a material that is flexible without permanent deformation during inflation and deflation of said body between said inflated and deflated conditions, whereby said body may resume its former shape when deflated.

2. A flow control bladder as set forth in claim 1, wherein said fluid passage means includes an inflation stem communicating with said hollow interior.

3. A flow control bladder as set forth in claim 1, wherein said peripheral side folds have central straight parallel segments.

4. A flow control bladder as set forth in claim 1, wherein said first and second panel walls are joined to one another by opposite peripheral edge folds extending between said peripheral side folds.

5. A flow control bladder as set forth in claim 1, including retaining tab means extending outwardly from one of said panel walls for cooperating with a hole in the conduit to hold said body in position in the conduit.

6. A flow control bladder as set forth in claim 1, in combination with said conduit and wherein said inner fold in each side wall extends parallel to the intended direction of flow through said conduit.

7. A combination as set forth in claim 6, wherein said conduit is rectangular in cross-section having orthogonal axes, said panel walls have a length equal the dimension of said conduit along one of said orthogonal axes, and said side walls have a length equal the dimension of said conduit along the other one said orthogonal axes.

8. A flow control bladder as set forth in claim 1, wherein said first and second panel walls have curved side edges meeting at opposite ends of said body.

9. A flow control bladder as set forth in claim 1, wherein said inner folds extend along parallel straight fold lines symmetrically offset from a longitudinal center line of said body.

10. A flow control bladder as set forth in claim 1, wherein said side walls include a plurality of inner folds which open in a direction opposite the peripheral side folds.

11. A flow control bladder as set forth in claim 10, wherein said panel walls are substantially elliptical in shape.

12. A flow control bladder as set forth in claim 1, wherein said folds are set in shape so that upon deflation the folds exert a resilient restoring force causing the bladder to return to its former shape when deflated.

13. A flow control bladder as set forth in claim 1, wherein said bladder is made of a material that is flexible without permanent deformation during inflation and deflation of said body between said inflated and deflated conditions, whereby said body may resume its former shape when deflated.

14. A flow control bladder as set forth in claim 13, wherein said body includes means for exerting a resilient restoring force causing the bladder to return to its former shape when deflated.

15. A flow control bladder as set forth in claim 1, including spaced apart retaining tab means extending outwardly from one of said panel walls for cooperating with respective holes in the conduit to hold said body in position in the conduit.

16. A flow control bladder as set forth in claim 15, wherein at least one of said retaining tab means includes an inflation stem communicating with said hollow interior.

* * * * *